(12) United States Patent
Ishii et al.

(10) Patent No.: US 11,475,911 B2
(45) Date of Patent: Oct. 18, 2022

(54) ESTIMATION DEVICE, ESTIMATION METHOD AND PROGRAM

(71) Applicant: NIPPON TELEGRAPH AND TELEPHONE CORPORATION, Tokyo (JP)

(72) Inventors: Ryo Ishii, Tokyo (JP); Ryuichiro Higashinaka, Tokyo (JP); Junji Tomita, Tokyo (JP); Shiro Kumano, Tokyo (JP); Kazuhiro Otsuka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 17 days.

(21) Appl. No.: 16/967,686

(22) PCT Filed: Feb. 5, 2019

(86) PCT No.: PCT/JP2019/004084
§ 371 (c)(1),
(2) Date: Aug. 5, 2020

(87) PCT Pub. No.: WO2019/156079
PCT Pub. Date: Aug. 15, 2019

(65) Prior Publication Data
US 2021/0035600 A1    Feb. 4, 2021

(30) Foreign Application Priority Data
Feb. 7, 2018 (JP) .............................. JP2018-020514

(51) Int. Cl.
*G10L 25/78* (2013.01)
*G10L 25/51* (2013.01)
*G10L 25/57* (2013.01)

(52) U.S. Cl.
CPC .............. *G10L 25/78* (2013.01); *G10L 25/51* (2013.01); *G10L 25/57* (2013.01)

(58) Field of Classification Search
None
See application file for complete search history.

(56) References Cited

U.S. PATENT DOCUMENTS

| | | | | |
|---|---|---|---|---|
| 5,440,624 A | * | 8/1995 | Schoof, II | ........... H04L 12/1813 379/202.01 |
| 7,907,165 B2 | * | 3/2011 | Murai | .................... H04N 7/147 348/14.08 |

(Continued)

FOREIGN PATENT DOCUMENTS

| | | |
|---|---|---|
| JP | 2006-338493 A | 12/2006 |
| JP | 2009-163431 A | 7/2009 |

(Continued)

OTHER PUBLICATIONS

R. Ishii, S. Kumano and K. Otsuka, "Predicting next speaker based on head movement in multi-party meetings," 2015 IEEE International Conference on Acoustics, Speech and Signal Processing (ICASSP), 2015, pp. 2319-2323, doi: 10.1109/ICASSP.2015.7178385. (Year: 2015).*

(Continued)

*Primary Examiner* — Shaun Roberts

(57) ABSTRACT

In communication performed among multiple participants, at least one of a participant who will start speaking next and a timing thereof is estimated.

An estimation apparatus includes a head motion information generation unit that acquires head motion information representing head motions of communication participants in a time segment corresponding to an end time of an utterance segment and synchronization information for head motions between the communication participants, and an estimation unit that estimates at least one of the speaker of the next (Continued)

utterance segment following the utterance segment and the next utterance start timing following the utterance segment based on the head motion information and the synchronization information for the head motions between the communication participants.

20 Claims, 4 Drawing Sheets

(56) References Cited

U.S. PATENT DOCUMENTS

| | | | |
|---|---|---|---|
| 9,596,349 B1* | 3/2017 | Hernandez | G06F 40/205 |
| 2002/0101505 A1* | 8/2002 | Gutta | H04N 7/15 |
| | | | 348/14.07 |
| 2015/0143221 A1* | 5/2015 | Ahuja | G07F 17/3206 |
| | | | 715/230 |

FOREIGN PATENT DOCUMENTS

| | | |
|---|---|---|
| JP | 2012-146072 A | 8/2012 |
| JP | 2016-111426 A | 6/2016 |
| JP | 20017-118364 A | 6/2017 |

OTHER PUBLICATIONS

Ishii, Ryo, et al., "Prediction of next-Utterance Timing Using Head Movement in Multi-Party Meetings," HAI '17, Proceedings of the 5th International Conference on Human Agent Interaction, Oct. 2017.

* cited by examiner

ESTIMATION DEVICE, ESTIMATION METHOD AND PROGRAM

CROSS-REFERENCE TO RELATED APPLICATIONS

This application is a U.S. 371 Application of International Patent Application No. PCT/JP2019/004084, filed on 5 Feb. 2019, which application claims priority to and the benefit of JP Application No. 2018-020514, filed on 7 Feb. 2018, the disclosures of which are hereby incorporated herein by reference in their entireties.

TECHNICAL FIELD

The present invention relates to a technique for estimating at least one of a participant who will start speaking next and a timing thereof in communication performed among multiple participants.

BACKGROUND ART

There have been proposals of an approach for estimating a participant who will start speaking next (the next speaker) by analysis of information on speech and video, and an approach for reducing collisions of utterances by notifying the participants of the next speaker based on a result of estimation in communication performed among multiple participants (see Patent Literatures 1 and 2, for instance)

A method of estimating the next speaker and the timing thereof by utilizing the fact that participants' head motions have high relevance to the next speaker and the timing thereof has also been proposed (e.g., Patent Literature 3).

CITATION LIST

Patent Literature

Patent Literature 1: Japanese Patent Laid-Open No. 2006-338493
Patent Literature 2: Japanese Patent Laid-Open No. 2012-146072
Patent Literature 3: Japanese Patent Laid-Open No. 2016-111426

SUMMARY OF THE INVENTION

Technical Problem

These approaches for estimating the next speaker however have low estimation accuracy and are not sufficient. The approach of Patent Literature 2 claims that the next speaker can be estimated from the motions or synchronization rhythms of the participants but does not set forth a specific method of calculation. With the approach of Patent Literature 1, a focus person who has been watched by the participants other than the speaker is determined to be the next speaker. However, this approach has a challenge in accuracy in that the next speaker is not always gazed by the other participants. Also, there has been no attempt to estimate a strict timing, such as when the next speaker will start speaking.

The present invention has been made in view of these circumstances and an object thereof is to estimate at least one of a participant who will start speaking next (hereinafter, also called "next speaker") and a timing thereof (hereinafter, also called "next utterance start timing") in communication performed among multiple participants.

Means for Solving the Problem

To attain the object, an estimation apparatus according to an aspect of the present invention includes: a head motion information generation unit that acquires head motion information representing a head motion of each one of communication participants in a time segment corresponding to an end time of an utterance segment and computes synchronization information indicating a degree of synchronization of head motions between the communication participants; and an estimation unit that estimates at least one of a speaker of a next utterance segment following the utterance segment and a next utterance start timing following the utterance segment based on the synchronization information for the head motions between the communication participants.

To attain the object, an estimation method according to another aspect of the present invention includes: acquiring, by a head motion information generation unit, head motion information representing a head motion of each one of communication participants in a time segment corresponding to an end time of an utterance segment and computing synchronization information indicating a degree of synchronization of head motions between the communication participants; and estimating, by an estimation unit, at least one of a speaker of a next utterance segment following the utterance segment and a next utterance start timing following the utterance segment based on the synchronization information for the head motions between the communication participants.

Effects of the Invention

The present invention can estimate at least one of the next speaker and the next utterance start timing in communication performed among multiple participants.

DESCRIPTION OF EMBODIMENTS

Figure 1:
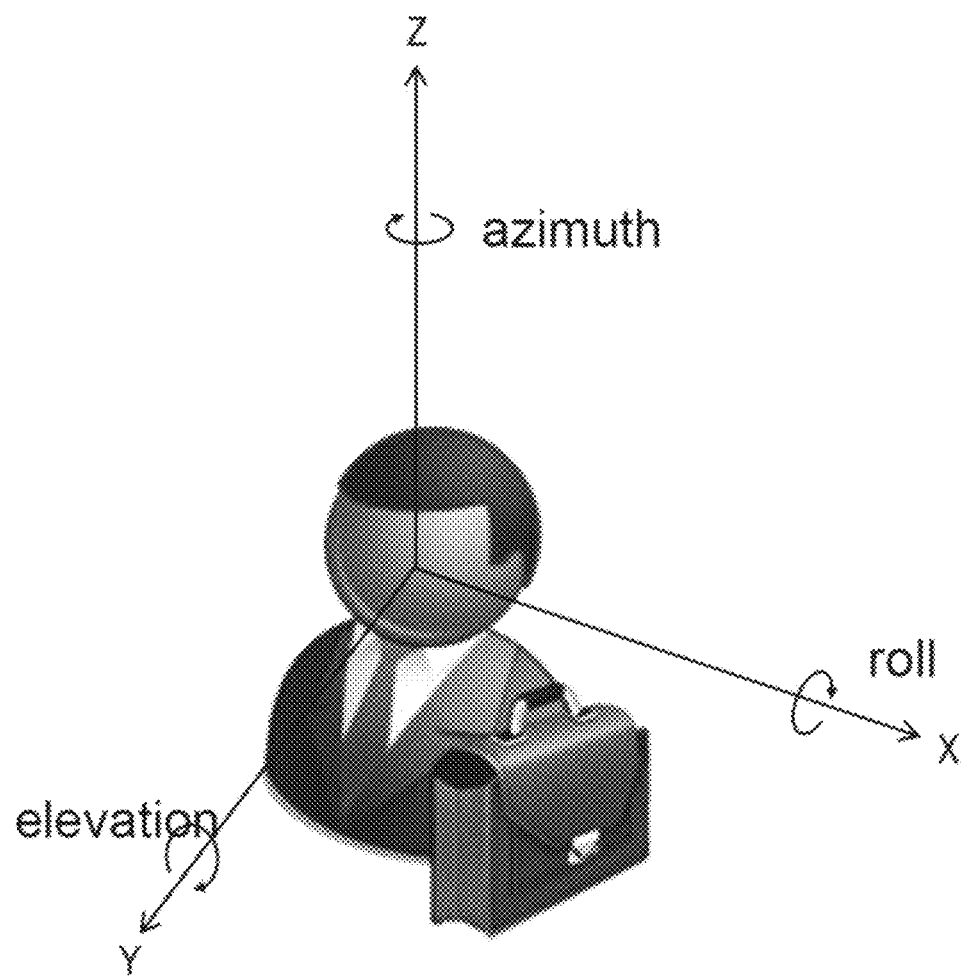
FIG. 1 is a diagram for illustrating a head state handled in a first embodiment.

Embodiments of the present invention are now described with reference to the drawings. In the following description, the same reference numerals are used for functional components and processing that are already described and overlapping descriptions are omitted.

<First Embodiment>

A first embodiment makes use of a strong correlation present between head motions of participants and a degree of synchronization of the head motions between the participants around the end of an utterance, and the next speaker and the next utterance start timing in communication performed among multiple participants including conversations. A head motion as handled in this embodiment is obtained based on at least one of a total of six-degree-of-freedom information, including changes in head position in three degrees of freedom including front/back, right/left and up/down, and changes in head rotation angle in three degrees of freedom. Six-degree-of-freedom information is measured with a head measuring device (a head tracker), for example. In a coordinate system such as the one shown in FIG. 1, a head state is defined as position and rotation information of six degrees of freedom, including three-dimensional positions (X,Y,Z) and three-degree-of-freedom rotation angles (azimuth, elevation, roll), and the position and the rotation angle are represented by the respective coordinate values.

This embodiment utilizes the facts that (1) the head motion (e.g., movement or rotation of the head) around the end of an utterance differs between when a participant who is currently making an utterance (hereinafter, also referred to as "the current speaker") further continues the utterance and when he/she does not, and that (2) the head motion around the end of an utterance differs between when a non-speaker (a person other than a speaker, a participant other than the current speaker) starts to speak next (i.e., becomes the next speaker) and when he/she does not. In a dialogue between four persons, for example, (A) the amounts of change in the head positions X, Y, Z, and the rotation angle, roll, the amplitudes of waves representing changes in the head motion for the head positions Y, Z and the rotation angle, roll, (hereinafter, sometime called just "amplitude"), and the frequencies of waves representing changes in the head motion for the rotation angle, elevation, (hereinafter, also called just "frequency") for the current speaker tend to be larger in a turn-taking than in turn-keeping. It has also been found that (B) the frequency in the head position Y for the current speaker tends to be smaller in turn-taking than in turn-keeping. Also, (C) the amounts of change and the amplitudes in the head positions X, Y, Z, and the rotation angles, azimuth, elevation and roll are larger with a non-speaker and the next speaker in turn-taking than with a non-speaker in turn-keeping. A non-speaker in turn-keeping refers to a participant other than the current speaker, and a non-speaker in turn-taking refers to a participant other than the current speaker and the next speaker. Conversely, (D) the frequencies in the head positions X, Y, Z, and the rotation angles, azimuth, elevation and roll tend to be smaller with a non-speaker and the next speaker in turn-taking than with a non-speaker in turn-keeping. (E) The amounts of change in the head positions X, Z are larger with the next speaker than with a non-speaker in turn-taking. Conversely, (F) the frequency in the head position Z tends to be smaller with the next speaker than with a non-speaker in turn-taking. These tendencies however are merely examples, and the same tendencies do not always apply to all situations and dialogues. Nevertheless, there are such correlations between the head motion, and the next speaker and the utterance start timing; use of head motions based on head state information is considered to be very useful for estimating the next speaker and utterance start timing.

This embodiment computes these amounts of change, amplitudes and frequencies in the head positions X, Y, Z, and the rotation angles for each participant individually, and uses them to predict the next speaker and the utterance start timing.

It further computes synchronization information indicating the degree of synchronization of head motions between the participants, and additionally uses the synchronization information for head motions between the participants to predict the next speaker and the utterance start timing. Only by way of example, since the head motions of the current speaker and the next speaker tend to synchronize with each other, synchronization information for head motions between the participants is useful information.

In this embodiment, utterance units are automatically generated first from speech information for the participants. Then, using as input head state information (e.g., six-degree-of-freedom head positions (X,Y,Z) and rotation angles (azimuth, elevation, roll)) with utterance units for all of the participants or multiple participants, head motion information (e.g., the amounts of change, amplitudes, and frequencies for the respective coordinate values and rotation angles) is generated. The head motion information is information on the head motion of each communication participant in a time segment corresponding to the end time of an utterance segment. Also, synchronization information indicating the degree of synchronization of head motions between the communication participants is computed. A prediction model for predicting what the next speaker and the utterance start timing will be according to parameters for these pieces of information is learned previously or online using a machine learning technique or the like. Then, the next speaker and the utterance start timing are estimated are output with high accuracy based on the amounts of change, amplitudes, and frequencies for the coordinate values and rotation angles and on synchronization information for head motions between the participants in a time segment corresponding to the end time of an utterance segment.

The communication handled in this embodiment may be face-to-face communication among participants or remote communication based on video such as a video phone or video chat. Alternatively, other participants engaging in remote communication may be present at locations remote from the multiple participants engaging in face-to-face communication such that both face-to-face and remote communications take place. Also, the participants may be communication robots having communication ability comparable to that of the human being. The number of participants in communication is not limited as long as it is two or more.

<System Configuration of the Embodiment>

Figure 2:
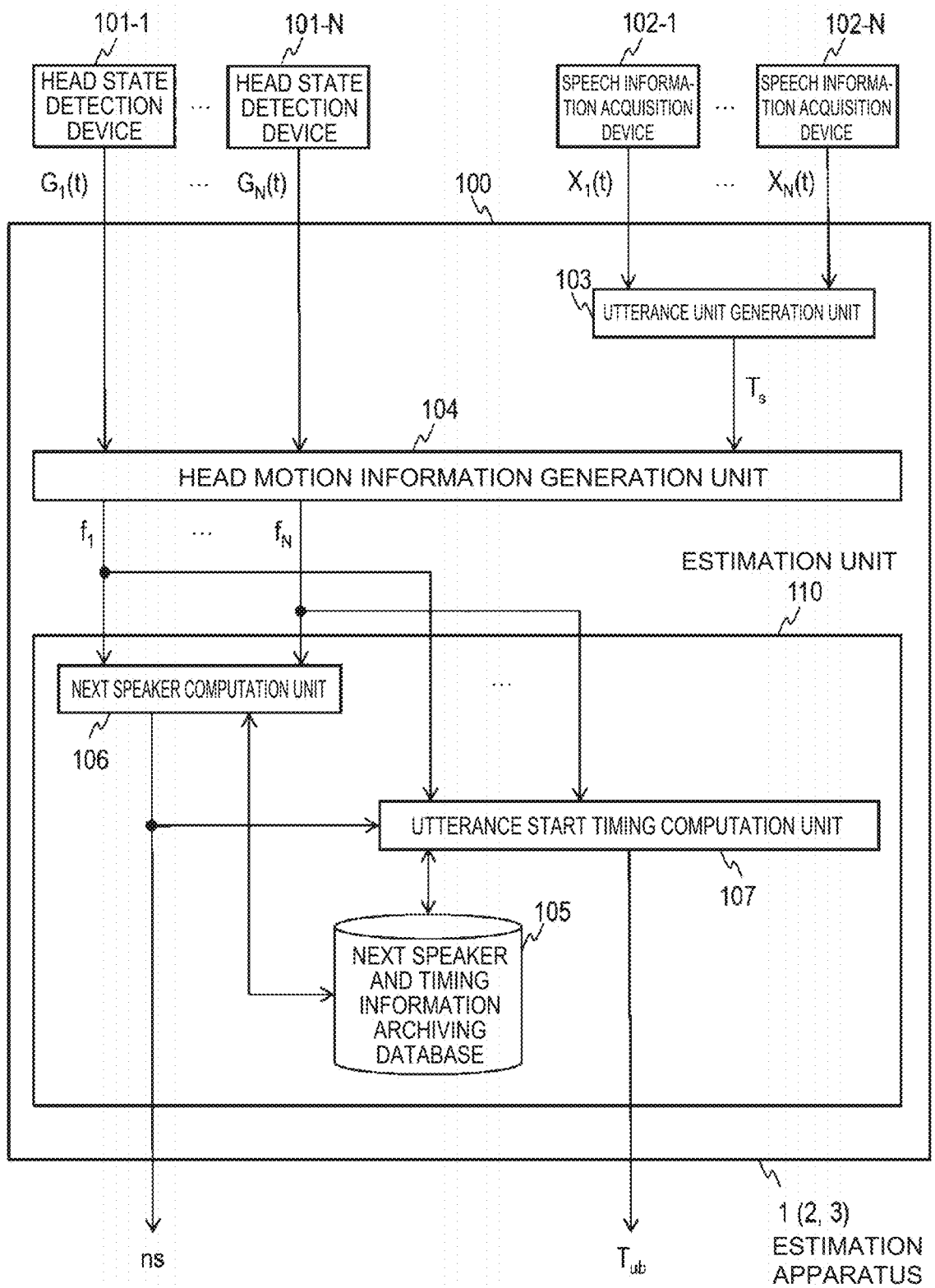
FIG. 2 is a functional block diagram of an estimation apparatus according to the first embodiment.
Figure 3:
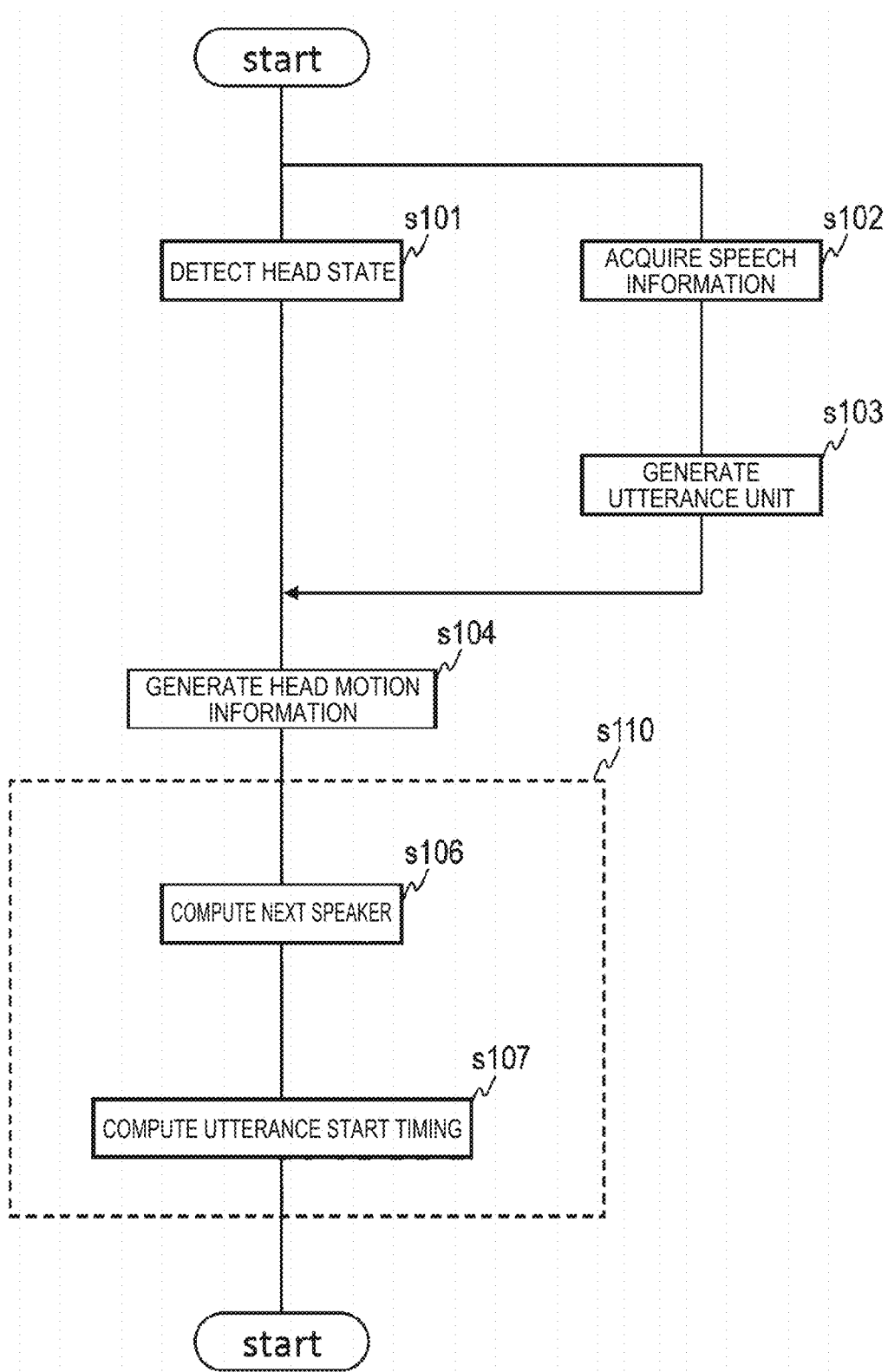
FIG. 3 shows an example of a processing flow for the estimation apparatus according to the first embodiment.

FIG. 2 shows a functional block diagram of a system according to this embodiment, and FIG. 3 shows an example of its processing flow. As illustrated in FIG. 2, the system of this embodiment includes an estimation apparatus 100, N head state detection devices 101-1 to N and speech information acquisition devices 102-1 to N. The estimation apparatus 100 includes an utterance unit generation unit 103, a head motion information generation unit 104, and an estimation unit 110. The estimation unit 110 includes a next speaker computation unit 106, an utterance start timing computation unit 107, and a next speaker and timing information archiving database 105. N is an integer greater than 1, representing the number of participants $U_1$ to $U_N$ in communication. A head state detection device 101-$j$ and a speech information acquisition device 102-$j$ detect the head state and acquire speech information for each participant $U_1$ (where j=1, . . . , N), respectively. When the present system is used in a face-to-face communication setting, the head state detection devices 101-1 to N and the speech information acquisition devices 102-1 to N are placed at a location where the participants $U_1$ to $U_N$ perform face-to-face communication, and information obtained by them is directly sent to the estimation apparatus 100. When the present system is used in a remote communication setting, each head state detection device 101-$j$ and each speech information acquisition device 102-$j$ are placed at a location where each participant $U_j$ is present, and information obtained by them is transmitted to the estimation apparatus 100 over a network. When the present system is used in a setting where both face-to-face and remote communications are performed, the head state detection device 101-*j* and the speech information acquisition device 102-*j* are placed at a location where each participant $U_j$ is present, and information obtained by them is sent to the estimation apparatus 100 over a network or directly.

The present system continuously performs estimation of the next speaker and the utterance start timing by repeating a series of processing executed by the head state detection devices 101-1 to N, the speech information acquisition devices 102-1 to N, the utterance unit generation unit 103, the head motion information generation unit 104, and the estimation unit 110. Since the next speaker computation unit 106 estimates the next speaker and the utterance start timing computation unit 107 estimates the utterance start timing, they can perform processing independently from each other. Thus, it is also possible to use only either one of them. In a case only the computation of the utterance start timing is performed with the utterance start timing computation unit 107 without computation of the next speaker with the next speaker computation unit 106, the next speaker sent from the next speaker computation unit 106 to the utterance start timing computation unit 107 shown in FIG. 2 will not be available. That is, the next speaker cannot be known but who will start an utterance at about which timing will be output.

Next, the processing performed by the individual components is discussed. The present description assumes a face-to-face communication setting with four participants.

[Head State Detection Device 101-*j*]

The head state detection device 101-*j* detects a head state $G_j(t)$ of each participant $U_j$ (s101), and sends information representing the participant $U_j$ and the head state $G_j(t)$ to the estimation unit 110. Here, t represents a discrete time. The head state refers to a state represented by at least one of three-degree-of-freedom head positions and three-degree-of-freedom rotation angles, for example. For example, the head state is obtained using a known head measuring device (head tracker) and the like. Head measuring devices (head trackers) based on a variety of methodologies are available, such as one that utilizes a magnetic sensor, one that attaches an optical marker to the head and captures its position with a camera, or one that uses face detection processing via image processing. Any of these approaches may be used. The head state acquired herein is information on three-degree-of-freedom head positions including front/back, right/left and up/down and three-degree-of-freedom head rotation angles, i.e., six degrees of freedom in total. For example, the head state is defined as the head positions and rotation angles of six degrees of freedom, i.e., three-dimensional position (X,Y,Z) and three-degree-of-freedom rotation angles (azimuth, elevation, roll), in a coordinate system such as shown in FIG. 1, the head position and the rotation angle being represented by the respective coordinate values. The following description assumes acquiring the head position and the rotation angle in the coordinate system of FIG. 1 as the head state.

[Speech Information Acquisition Device 102-*s*]

A speech information acquisition device 102-*s* (where s=1, ..., N) is a device that acquires speech information for a participant $U_s$ (s102) and sends information representing the acquired speech information $X_s(t)$ to the estimation apparatus 100. For example, the speech information acquisition device 102-*s* acquires the speech information $X_s(t)$ for the participant $U_s$ using a microphone.

[Utterance Unit Generation Unit 103]

The utterance unit generation unit 103 takes the speech information $X_s(t)$ as input, removes noise components from the speech information $X_s$ to extract only utterance components, and obtains an utterance segment $T_s$ therefrom (s103) and outputs it. In this embodiment, the utterance segment $T_s$ is information representing the utterance start time and the utterance end time. Speaker information, which indicates who is the speaker for the extracted utterance segment $T_s$, is acquired and output with the utterance segment $T_s$. While in this embodiment one speech information acquisition device 102-*s* is assigned to each one of N participants $U_s$, M ($\neq$N) speech information acquisition devices may be assigned to N participants $U_s$. For example, if speech of all the participants $U_s$ (i.e., N persons) is contained in the speech information acquired by M speech information acquisition devices, speech of each participant $U_s$ is extracted by the use of temporal differences in collected speeches between the respective speech information acquisition devices, volume of sound, acoustic features, etc. Any other generally conceivable means may be used. In this embodiment, one utterance segment $T_s$ is defined as a time segment including a segment in which utterance components are present and which is surrounded by silence segments that continue for Td [ms]. That is, one utterance segment $T_s$ in this embodiment is a time segment formed from a segment in which utterance components are present and which is surrounded by two silence segments that continue for Td [ms]. For instance, given that Td is 200 ms, when there is continuous utterance data for participant $U_s$ that includes 500 ms of silence, 200 ms of utterance, 50 ms of silence, 150 ms of utterance, 150 ms of silence, 400 ms of utterance and 250 ms of silence, one utterance segment of 950 ms surrounded by a silence segment of 500 ms and a silence segment of 250 ms will be generated. One utterance segment $T_s$ in this embodiment contains no other silence segment that continues for Td [ms] and is surrounded by segments in which utterance components are present, between two silence segments that continue for Td [ms]. In this embodiment, such an utterance segment $T_s$ is defined as one unit of utterance by the participant $U_s$, and at the end of a certain utterance segment $T_s$, (1) which participant will make an utterance next and (2) when the start of the utterance will be, are determined. The value Td may be determined as desired depending on the situation. If Td is long, however, the time between the actual end of an utterance and determination of the end of the utterance segment becomes long. Thus, Td of about 200 to 500 ms is appropriate for common everyday conversation. The utterance unit generation unit 103 outputs the utterance segment $T_s$ thus acquired and the corresponding speaker information (information representing who made the utterance) to the head motion information generation unit 104. Since the utterance segment $T_s$ is determined in the foregoing manner, the utterance segment $T_s$ is generated after the end of the corresponding utterance (at least after the elapse of a silence segment that continues for Td [ms] from the last extraction of utterance components).

[Head Motion Information Generation Unit 104]

The head motion information generation unit 104 takes as input information representing the participant $U_j$ and the head state $G_j(t)$, and the utterance segment $T_s$ and the corresponding speaker information, generates head motion information $f_j$ representing the head motion of each participant $U_j$ around the end of the utterance segment (s104) and outputs it. The head motion information $f_j$ represents the motion of the head of the participant $U_j$ in the time segment corresponding to the end time $T_{se}$ of the utterance segment $T_s$. This embodiment illustrates head motion information $f_j$ for the participant $U_j$ in a finite time segment including the end time $T_{se}$ (see FIG. 4). For example, the head motion information generation unit 104 extracts head states including the six-degree-of-freedom head positions (X,Y,Z) and rotation angles (azimuth, elevation, roll) of the current speaker and non-speakers around the end of the utterance segment $T_s$ from the input information representing the participant $U_j$ and the head state $G_j(t)$, and generates the amounts of change, amplitudes, and frequencies of the respective coordinate values and rotation angles (see FIG. 4).

Figure 4:
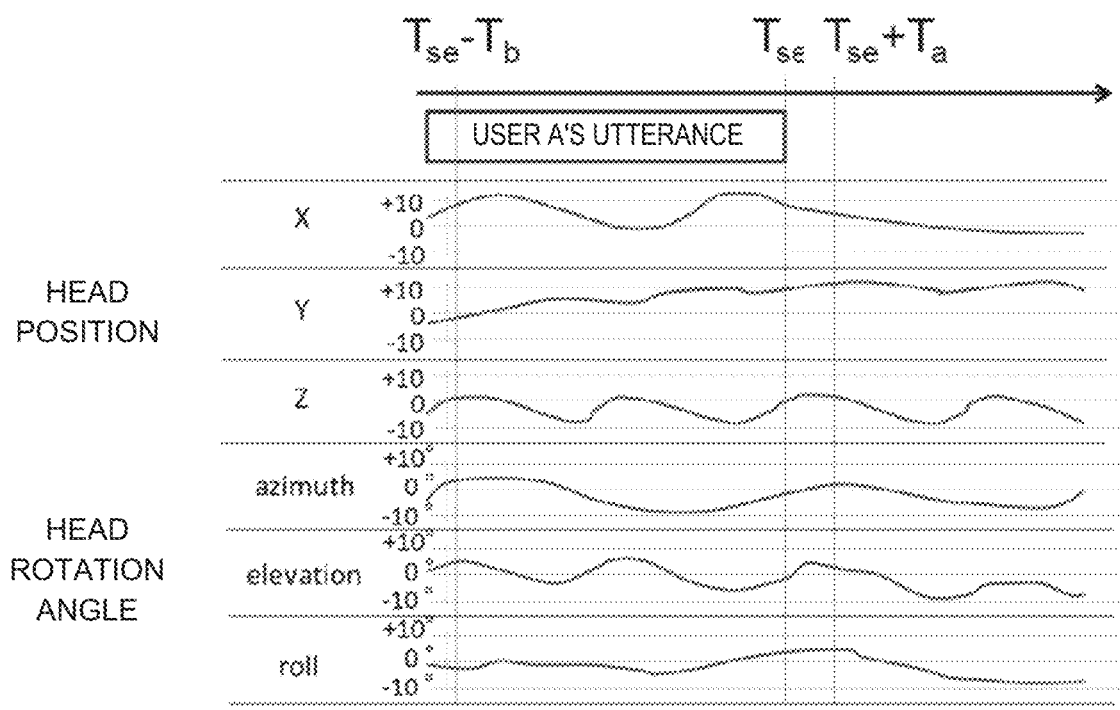
FIG. 4 is a diagram for illustrating head motions handled in the first embodiment.

FIG. 4 shows how to compute the amounts of change, amplitudes and frequencies for the head positions and rotation angles from the head position and rotation angle of participant A when participant A has been the current speaker. Although FIG. 4 only shows the head positions and rotation angles of participant A for the purpose of illustration, in practice, similar information is computed also for participants B, C and D, who are non-speakers. When generating the amounts of change, amplitudes and frequencies for the head positions and rotation angles, attention is paid only to those head states that occurred in the segment from before the end of the utterance segment $T_{se}-T_b$ to after the end of the utterance segment $T_{se}+T_a$, with respect to the end time $T_{se}$ of the utterance segment.

While $T_b$ and $T_a$ may be arbitrary values, as a guide, $T_a$ of 0 s to 2.0 s and $T_b$ of 0 s to 5.0 s are appropriate.

The following three parameters are computed for each of the coordinate values of the head positions (X,Y,Z) and each rotation angle of the head rotation angles (azimuth, elevation, roll) in the aforementioned segment between before the end of the utterance segment $T_{se}-T_b$ and after the end of the utterance segment $T_{se}+T_a$.

AC (average amount of change): an average of the amount of change in the head position or the rotation angle per certain unit time. For example, an average amount of change over one second.

AM (average amplitude): an average of the amplitude of a wave when a change in the head position or the rotation angle is regarded as the oscillation of a wave.

FQ (average frequency): an average of the frequency of a wave when a change in the head position or the rotation angle is regarded as the oscillation of a wave.

For example, assume that when $T_a$ is 2.0 s and $T_b$ is 5.0 s in FIG. 4, the amount of change is 35 cm and two cycle's worth of waves are extracted during an analysis segment of 7.0 s at a position on the Z-axis representing the head position. Then, the average amount of change AC, i.e., the average of the amount of change per second, is 5 (cm/s), the average amplitude AM is 8.75 cm, and the average frequency FQ is approximately 0.29 Hz.

In a similar manner, the average amount of change AC, average amplitude AM, and average frequency FQ are computed for the respective coordinate positions and rotation angles for the head motions of all the participants. Hereinafter, the "average amount of change AC, average amplitude AM, and average frequency FQ for the respective coordinate positions and rotation angles of the head motion" are also called head motion information. The head motion information has only to include at least one of AC, AM and FQ for at least one of the respective coordinate positions and rotation angles of the head motion (X, Y, Z, azimuth, elevation and roll).

A method of computing the degree of synchronization of head motions between the participants is using differences in the average amount of change AC, average amplitude AM, and average frequency FQ between certain participants for the head position or the rotation angle.

A difference of acceleration at each of the coordinate positions and the rotation angles at a certain time is also computed. The degree of synchronization based on acceleration between participants a and b is computed according to the following expression (see Non-Patent Literature 1).

$$S_{ab}(t) = \left\{ S_{ab} = \tau \mid \max_{\tau}(f(t,\tau)) \text{ in } |\tau - t| < \varepsilon, \right. \quad \text{[Formula 1]}$$

$$\left. f(t,\tau) = \sum_i a(t+i) \cdot b(t+i+\tau) \right\}$$

The values a(t) and b(t) are the acceleration of a certain parameter out of the head positions (x,y,z), (azimuth, elevation, roll) of certain participants a and b at time t, respectively. The degree of synchronization $S_{aa}(t)$ of the participant a is determined with an expression with b(t) replaced by a(t) in the above expression. S(t) is a time function for lag (i) that returns the maximum correlation value when determining the auto-correlation or cross-function of an acceleration change cut out by a time window (ε) that shifts by a certain constant width. A lag $S_{ab}$ in synchronization between the two persons a and b is divided by $S_{aa}$ at the time in question, thereby converted from time domain to phase domain. This $S_{ab}$ is computed for all pairs of participants.

[Non-Patent Literature 1]: Kato Masaharu, "The demonstration of phase synchronization during paired walking", the Institute of Electronics, Information and Communication Engineers Transaction, Journal 115(35), 177-180, 2015-05-19

The head motion information generation unit 104 extracts the head motion information $f_j$ for all the participants and synchronization information $S_j$ for head motions between the participants corresponding to the segment from before the end of the utterance segment $T_{se}-T_b$ to after the end of the utterance segment $T_{se}+T_a$, based on the utterance end time indicated by the utterance segment $T_s$. The head motion information generation unit 104 outputs the speaker information for the (current) utterance segment $T_s$ and head motion information $f_1$ of all the participants, and synchronization information $S_j$ for head motions between the participants to the next speaker computation unit 106, and outputs the speaker information for the (current) utterance segment $T_s$, the utterance end time $T_{se}$ indicated by the (current) utterance segment $T_s$, the head motion information $f_j$ for all the participants, and synchronization information S for head motions between the participants to the utterance start timing computation unit 107.

In the case of learning the prediction model online at the next speaker computation unit 106 and/or the utterance start timing computation unit 107 as discussed later, at a point when the next utterance segment $T_s$ (the start time $T_{ss'}$ and end time $T_{se'}$ of the utterance) and the corresponding speaker information are sent from the utterance unit generation unit 103, the head motion information for all the participants, synchronization information for head motions between the participants, the utterance segment $T_s$ (the start time $T_{ss}$ and end time $T_{se}$ of the utterance) and the corresponding speaker information, and further the next utterance segment $T_s$ (the start time $T_{ss'}$ and end time $T_{se'}$ of the utterance) and the corresponding speaker information are sent to the next speaker and timing information archiving database 105. This information sent to the next speaker and timing information archiving database 105 is used in constructing the prediction model. This information is past information, such as "who will be the next speaker?" or "when an utterance will be started?" for a certain piece of head motion information, and prediction is performed based on these pieces of information.

[Next Speaker and Timing Information Archiving Database 105]

The next speaker and timing information archiving database 105 is a database in which information acquired by the head motion information generation unit 104 is held. It holds, at least, head motion information, synchronization information for head motions between the participants, and the next utterance segment (the start time of an utterance is also called utterance start timing information) and the corresponding speaker information (information representing the next speaker) for that head motion information. These pieces of information are utilized for setting learning data and decision parameters during the construction of the prediction model at the next speaker computation unit 106 and/or the utterance start timing computation unit 107. By preserving similar kinds of information (head motion information, synchronization information for head motions between the participants, the next speaker and utterance start timing information) from past conversation data beforehand, more data becomes available for the processing at the next speaker computation unit 106 and the utterance start timing computation unit 107.

As a specific flow of processing, in the case of learning the prediction model online at the next speaker computation unit 106 and/or the utterance start timing computation unit 107 as discussed later, at a point when the head motion information for each participant and synchronization information for head motions between the participants are sent from the head motion information generation unit 104, the head motion information, the synchronization information for head motions between the participants, and the speaker of the next utterance following the utterance segment corresponding to that head motion information (the next speaker) are sent to the next speaker computation unit 106, and the head motion information, the synchronization information for head motions between the participants, the utterance start timing information for the next utterance segment following the utterance segment corresponding to that head motion information, and its speaker (the next speaker) are sent to the utterance start timing computation unit 107.

In the case of learning the prediction model beforehand only with past information at the next speaker computation unit 106 and/or the utterance start timing computation unit 107 as discussed later, information held in the next speaker and timing information archiving database 105 is sent to the next speaker computation unit 106 and the utterance start timing computation unit 107 as preprocessing at the start of processing.

It is further possible to learn the prediction model with past information beforehand and then learn it based on information acquired online. In that case, new head motion information, the next speaker and the utterance start timing information will be sent from the head motion information generation unit 104 in the course of a series of processing. Such information is also entirely or partly held in the next speaker and timing information archiving database 105 as it is sent, and used for leaning of the prediction model at the next speaker computation unit 106 and the utterance start timing computation unit 107.

[Next Speaker Computation Unit 106]

The next speaker computation unit 106 computes (S106) and outputs the next speaker, using speaker information for utterances in the past, head motion information for all the participants and synchronization information for head motions between the participants corresponding to each of those utterances, and the speaker of the next utterance following each one of the utterances (i.e., the next speaker), which are sent from the next speaker and timing information archiving database 105, as well as the speaker information for the current utterance segment $T_s$, head motion information for all the participants, and synchronization information for head motions between the participants, which are sent from the head motion information generation unit 104.

Possible methods of computation include determining the next speaker by using the speaker information and at least one data on each head motion information (e.g., head motion information for all the participants, which is at least one of AC, AM and FQ for at least one of X, Y, Z, azimuth, elevation, and roll) or at least one of pieces of synchronization information for head motions between the participants, according to the relationship of magnitude between the at least one data on head motion information and thresholds, and determining the next speaker by supplying data on at least one piece of head motion information and synchronization information for head motions between the participants to a prediction model constructed through machine learning, such as represented by a support vector machine.

(1) Exemplary Processing Using Thresholds

For example, AC in X and Z tends to be larger with the next speaker than with a non-speaker in turn-taking. Utilizing this tendency and introducing certain thresholds $\alpha$ and $\beta$, when $AC > \alpha$ on X and/or $AC > \beta$ on Z hold, it is determined that a participant corresponding to head motion information that satisfies such condition(s) will be the next speaker. The speaker information for utterances in the past, head motion information for all the participants corresponding to each of those utterances, and the speaker of the next utterance following each one of those utterances (i.e., next speaker), sent from the next speaker and timing information archiving database 105, are used in determining the thresholds.

(2) Exemplary Processing Using a Prediction Model

First, leaning is performed with the following feature values as learning data for constructing a prediction model for predicting the next speaker.

Who is the speaker (speaker information)

The participant who made the next utterance

At least one or more of AC, AM, and FQ for the respective coordinate positions and rotation angles of the head motions of all the participants, and synchronization information for head motions between the participants (All of them may be employed, of course.)

What is to be predicted is:

The participant who made the next utterance. The learning data is data taken from the next speaker and timing information archiving database 105. Learning may be either performed only once at the start of use or performed every time data is received or data has been received a certain number of times as data increases online in the next speaker and timing information archiving database 105.

In this manner, the prediction model is constructed.

Next, using the learned prediction model, the participant who will make the next utterance is predicted from the following feature values acquired from the head motion information generation unit 104.

Who is the speaker (the current speaker information)

At least one or more of AC, AM, and FQ for the respective coordinate positions and rotation angles of the head motions of all the participants, and synchronization information for head motions between the participants (All of them may be employed, of course. Preferably, those that were used in constructing the prediction model are used.)

In this manner, the next speaker computation unit 106 computes the next speaker using the thresholds or the prediction model, and the current speaker information, pieces of head motion information, and synchronization information for head motions between the participants, sent from the head motion information generation unit 104. This prediction result (the next speaker) is one of output results.

[Utterance Start Timing Computation Unit 107]

The utterance start timing computation unit 107 computes (S107) and outputs the start time of the next utterance relative to the current utterance (utterance start timing information), using the speaker information for utterances in the past, head motion information for all the participants and synchronization information for head motions between the participants corresponding to each of those utterances, and the utterance start time of the next utterance following each one of the utterances (i.e., utterance start timing information), sent from the next speaker and timing information archiving database 105, the utterance end time indicated by the current utterance segment $T_s$, the speaker information for the utterance segment $T_s$, the head motion information $f_j$ for all the participants, and synchronization information $S_j$ for head motions between the participants, sent from the head motion information generation unit 104. Here, information on who the next speaker will be (an estimated value of the next speaker), which is a prediction result output from the next speaker computation unit 106, may be used for computation of the start time. The description hereinafter assumes that this information is also utilized.

Possible methods of computation include, using the speaker information and at least one of data on each head motion information (e.g., head motion information for all the participants, which is at least one of AC, AM and FQ for at least one of X, Y, Z, azimuth, elevation, and roll), (1) determining the start time of the next utterance according to the relationship of magnitude between the at least one data on head motion information and thresholds, (2) formulating the relationship between the at least one data on head motion information and synchronization information for head motions between the participants, and the interval $T_{ss'}-T_{se}$ from the end time $T_{se}$ of an utterance to the start time $T_{ss'}$ of the next utterance, and (3) determining utterance start timing information by supplying data on at least one piece of head motion information and synchronization information for head motions between the participants to a prediction model constructed through machine learning, such as represented by a support vector machine.

(1) Exemplary Processing Using Thresholds

For example, if there is a certain relationship between AC in X and the interval $T_{ss'}-T_{se}$ from the end time $T_{se}$ of an utterance to the start time $T_{ss'}$ of the next utterance, multiple thresholds are established such that the interval $T_{ss'}-T_{se}=a_1$ if $\alpha_1<AC<\alpha_2$, the interval $T_{ss'}-T_{se}=a_2$ if $\alpha_2 \leq AC<\alpha_3$, and the interval $T_{ss'}-T_{se}=a_3$ if $\alpha_3 \leq AC<\alpha_4$. For example, if the interval $T_{ss'}-T_{se}$ and AC have a positive proportionality relation, then $a_1<a_2<a_3$ is set. In this manner, the next utterance start timing following an utterance segment is determined based on the relationship of magnitude between the head motion information and the thresholds. The speaker information for utterances in the past, head motion information for all the participants corresponding to each of those utterances, and the start time of the next utterance following each one of the utterances (i.e., utterance start timing information), sent from the next speaker and timing information archiving database 105, are used in determining the thresholds.

(2) Method with formulation (a method using a relational expression). For example, the participants are classified into the current speaker, the next speaker, non-speakers, and all participants. For the value of AC in each case, the relationship of Tss'−Tse=f(AC) is formulated using past information on the interval Tss'−Tse from the end time Tse of an utterance to the start time Tss' of the next utterance. For example, if the time interval Tss'−Tse and AC have a positive proportionality relation, computation with Tss'−Tse=γ*AC (γ being an arbitrary value) is also possible. Aside from this, any approximate expression representing the relationship between AC and the interval $T_{ss'}-T_{se}$ can be utilized. From AC in each piece of head motion information for the current utterance, the interval from the end time of the utterance to the start time of the next utterance is determined with the relational expression $T_{ss'}-T_{se}=f(AC)$ and the determined interval is added to the end time of the current utterance, thereby computing the start time of the next utterance (utterance start timing information). The speaker information for utterances in the past, head motion information for all the participants corresponding to each of those utterances, and the start time of the next utterance following each one of the utterances (i.e., utterance start timing information), sent from the next speaker and timing information archiving database 105, are used in determining the relational expression.

(3) Exemplary Processing with a Prediction Model

First, learning is performed with the following feature values as learning data for constructing a prediction model for predicting the utterance start timing of the next speaker.

Who is the speaker (speaker information)

The participant who made the next utterance

At least one or more of AC, AM, and FQ for the respective coordinate positions and rotation angles of the head motions of all the participants, and synchronization information for head motions between the participants (All of them may be employed, of course.)

What is to be predicted is:

The interval $T_{ss'}-T_{se}$ from the end time $T_{se}$ of the current utterance to the start time $T_{ss'}$ of the next utterance. The learning data is data taken from the next speaker and timing information archiving database 105. Learning may be either performed only once at the start of use or performed every time data is received or data has been received a certain number of times as data increases online in the next speaker and timing information archiving database 105.

In this manner, the prediction model is constructed.

Next, using the learned prediction model, the interval from the end time of the current utterance to the start time of the next utterance is predicted from the following feature values acquired from the head motion information generation unit 104, from which the utterance start timing information is predicted.

Who is the speaker (the current speaker information)

The participant who will make the next utterance (the next speaker) as output by the next speaker computation unit 106

At least one or more of AC, AM, and FQ for the respective coordinate positions and rotation angles of the head motions of all the participants, and synchronization information for head motions between the participants (All of them may be employed, of course. Preferably, those that were used in constructing the prediction model are used.)

In this manner, the next speaker computation unit 106 computes the utterance start timing information using a relational expression or a prediction model, the current speaker information, pieces of head motion information, and synchronization information for head motions between the participants sent from the head motion information generation unit 104, and the next speaker sent from the next speaker computation unit 106. This prediction result (the utterance start timing information) is one of output results.

<Effects>

With these arrangements, at least one of the participant who will start speaking next and a timing thereof can be estimated in communication performed among multiple participants. Accurate and real-time prediction and estimation of the next speaker and the start timing of the next utterance becomes possible. Such estimation of the next speaker and the start timing of the next utterance is applicable in various scenes. For example, it serves as an underlying technique in a remote communication system with delay for making a participant avoid an utterance by presenting the participant with the next speaker based on the prediction result or for allowing a communication robot to make an utterance at a good timing while predicting the start of a participant's utterance.

The accuracy of estimation can be further increased by using an online-learned prediction model at the utterance start timing computation unit 107 and/or the next speaker computation unit 106. This is because, owing to large variation in head motion among individuals, the accuracy of estimation is higher when the prediction model is updated online and estimation is made based on information on the head motions of the current participants and synchronization information for head motions between the participants at the estimation apparatus, than when estimation is made only from a prediction model produced by learning based on the head motions of different persons.

<Variations>

While the embodiment above uses the average amount of change AC, the average amplitude AM and the average frequency FQ, the use of average values is not essential. Since what is required is making use of the strong correlation between the head motion, and the next speaker and the utterance start timing, representative values, such as minimums, maximums, and modes, of the amount of change, the amplitude and the frequency may be used, for example.

The present invention is not limited to the embodiments discussed above. For example, the utterance unit generation unit 103 may be arranged outside the estimation apparatus and the estimation apparatus may not include the utterance unit generation unit 103.

In the embodiments above, one utterance segment is formed from a segment surrounded by two or more silence segments that continue for Td [ms] and a segment in which utterance components are present and which is surrounded by them, and no other silence segment that continue for Td [ms] surrounded by segments in which utterance components are present is contained between the two silence segments that continue for Td [ms]. However, one utterance segment $T_j$ may instead be formed from a segment surrounded by two or more silence segments that continue for Td [ms] and a segment in which utterance components are present and which is surrounded by them, and may include other silence segment that continues for Td [ms] and is surrounded by segments in which utterance components are present between the two silence segments that continue for Td [ms].

In the embodiments above, the head motion information $f_1$ is the head motions of the participant $U_j$ in a finite time segment including the end time $T_{se}$. However, the head motion information $f_j$ may instead be information representing the head motions of the participant $U_j$ in a time segment near the end time $T_{se}$.

In the first embodiment, whether the speaker keeps the turn or someone else takes the turn is estimated and estimation of the next speaker is performed when it is determined that someone else takes the turn. However, only whether the speaker keeps the turn or someone else takes the turn may be estimated and the result thereof may be output.

In addition to being chronologically executed as described herein, the various kinds of processing described above may be executed in parallel or separately as appropriate for the processing ability of the device executing the processing or any necessity. It goes without saying that other modifications are possible without departing from the scope of the present invention.

The devices described above are each constituted by loading of a predetermined program into a general-purpose or dedicated computer having a CPU (central processing unit), RAM (random-access memory), and the like, for example. The program describes the processing actions of the functions that the device should provide, and the processing functions described above are implemented on the computer by executing it at the computer. The program describing the processing actions can be recorded on a computer-readable recording medium. An example of the computer-readable recording medium is a non-transitory recording medium. Examples of such a recording medium include a magnetic recording device, an optical disk, a magneto-optical recording medium, a semiconductor memory and the like.

The program is distributed by selling, transferring, or lending a removable recording medium such as a DVD and a CD-ROM with the program recorded thereon, for example. Further, the program may be stored in a storage device of a server computer and the program is transferred from the server computer to other computers over a network, thereby distributing the program.

A computer to execute such a program first once stores the program recorded in the removable recording medium or the program transferred from the server computer into its storage device, for example. When executing processing, the computer reads the program stored in its recording device and executes processing according to the program that has been read. As another form of executing the program, the computer may read the program directly from the removable recording medium and execute processing according to the program, and further execute processing according to a program received from the server computer every time a program is transferred therefrom to the computer. The processing described above may also be executed by a so-called ASP (Application Service Provider) service, which implements processing functions only via execution instructions for a program and acquisition of results without transferring the program from the server computer to the computer.

Although in the embodiments above the processing functions of the present apparatus are implemented by execution of predetermined programs on a computer, at least some of the processing functions may be implemented in hardware.

INDUSTRIAL APPLICABILITY

As described above, accurate and real-time prediction and estimation of the next speaker and the start timing of the next utterance becomes possible. Such estimation of the next utterance and the start timing of the next utterance is applicable in various scenes; for example, it serves as an underlying technique in a remote communication system with delay for making a participant avoid an utterance by presenting the participant with the next speaker based on the prediction result or for allowing a communication robot to make an utterance at a good timing while predicting the start of a participant's utterance.

REFERENCE SIGNS LIST 100 estimation apparatus
101 head state detection device
102 speech information acquisition device
103 utterance unit generation unit
104 head motion information generation unit
105 timing information archiving database
106 next speaker computation unit
107 utterance start timing computation unit
110 estimation unit

The invention claimed is:

1. A computer-implemented method for estimating aspects of a conversation, the method comprising:
  receiving head movement data of a plurality of participants of the conversation during a first time period, the plurality of participants including a first speaker and a first participant, and the first time period starting at a first predetermined time period prior to an end of an utterance by the first speaker of the conversation, the first time period ending at a second predetermined time after the end of the current utterance;
  generating synchronization data based at least on first head movement data of the first speaker and second head movement data of the first participant, the synchronization data correlating the first speaker and the first participant based on a difference between accelerations associated with the first head movement data and the second head movement data; and
  estimating, based at least on the synchronization data indicating a substantially correlated acceleration of head movement between the first speaker and the first participant during the first time period, the first participant as a second speaker of the conversation, the second speaker being a next speaker to the first speaker.

2. The computer-implemented method of claim 1, the method further comprising:
  interactively providing an indication of the estimated second speaker at least to the first speaker for causing the first speaker to keep silence as the estimated second speaker starts a second utterance.

3. The computer-implemented method of claim 1, the method further comprising:
  estimating a second time period, the second time period starting at the end of an utterance by the first speaker of the conversation, and the second time period ending at a beginning of a second utterance by the estimated second speaker; and
  automatically generating, by a third speaker, a third utterance prior to the estimated second time period elapses, the third speaker being distinct from the first speaker and the second speaker.

4. The computer-implemented method of claim 1, wherein the head movement data comprises:
  positions of heads of the plurality of participants of the conversation,
  rotation angles of heads of the plurality of participants of the conversation, and
  sound data of one or more of the plurality of participants of the conversation making one or more utterances.

5. The computer-implemented method of claim 1, the method further comprising:
  estimating the first participant as the second speaker based on:
    a degree of synchronized movement of heads of the first speaker and the first participant, the degree of synchronized movement of heads corresponding to a difference between acceleration of at least either linear or angular movement of the heads, and
    a predetermined threshold associated with the degree.

6. The computer-implemented method of claim 1, wherein the first time period starts before the second time period starts and the end of the first time period precedes the end of the second time period.

7. The computer-implemented method of claim 1, the method further comprising:
  training an estimation model using learning data, wherein the learning data is based on past conversation data, and wherein the past conversation data include one or more speakers from one or more past conversations and head movement data of a plurality of participants of the one or more past conversations; and
  estimating, based on the trained estimation model and the synchronization data, the second speaker of the conversation.

8. A system comprising:
  a processor; and
  a memory storing computer executable instructions that when executed by the at least one processor cause the system to:
    receive head movement data of a plurality of participants of the conversation during a first time period, the plurality of participants including a first speaker and a first participant, and the first time period starting at a first predetermined time period prior to an end of an utterance by the first speaker of the conversation, the first time period ending at a second predetermined time after the end of the current utterance;
    generate synchronization data based at least on first head movement data of the first speaker and second head movement data of the first participant, the synchronization data correlating the first speaker and the first participant based on a difference between accelerations associated with the first head movement data of the first speaker and the second head movement data of the first participant; and
    estimate, based at least on the synchronization data indicating a substantially correlated acceleration of head movement between the first speaker and the first participant during the first time period, the first participant as a second speaker of the conversation, the second speaker being a next speaker to the first speaker.

9. The system of claim 8, the computer-executable instructions when executed further causing the system to:
  interactively provide an indication of the estimated second speaker at least to the first speaker for causing the first speaker to keep silence as the estimated second speaker starts a second utterance.

10. The system of claim 8, the computer-executable instructions when executed further causing the system to:

estimate a second time period, the second time period starting at the end of an utterance by the first speaker of the conversation, and the second time period ending at a beginning of a second utterance by the estimated second speaker; and automatically generate, by a third speaker, a third utterance prior to the estimated second time period elapses, the third speaker being distinct from the first speaker and the second speaker.

11. The system of claim 8, wherein the head movement data comprises:

positions of heads of the plurality of participants of the conversation, rotation angles of heads of the plurality of participants of the conversation, and sound data of one or more of the plurality of participants of the conversation making one or more utterances.

12. The system of claim 8, the computer-executable instructions when executed further causing the system to:

estimating the first participant as the second speaker based on:

a degree of synchronized movement of heads of the first speaker and the first participant, the degree of synchronized movement of heads corresponding to a difference between acceleration of at least either linear or angular movement of the heads, and a predetermined threshold associated with the degree.

13. The system of claim 8, wherein the first time period starts before the second time period starts and the end of the first time period precedes the end of the second time period.

14. The system of claim 8, the computer-executable instructions when executed further causing the system to:

train an estimation model using learning data, wherein the learning data is based on past conversation data, and wherein the past conversation data include one or more speakers from one or more past conversations and head movement data of a plurality of participants of the one or more past conversations; and estimate, based on the trained estimation model and the synchronization data, the second speaker of the conversation.

15. A non-transitory computer-readable recording medium storing computer-executable program instructions that when executed by a processor cause a computer system to:

receive head movement data of a plurality of participants of the conversation during a first time period, the plurality of participants including a first speaker and a first participant, and the first time period starting at a first predetermined time period prior to an end of an utterance by the first speaker of the conversation, the first time period ending at a second predetermined time after the end of the current utterance;

generate synchronization data based at least on first head movement data of the first speaker and second head movement data of a first participant of the conversation, the synchronization data correlating the first speaker and the first participant based on a difference between accelerations associated with the first head movement data of the first speaker and the second head movement data of the first participant; and estimate, based at least on the synchronization data indicating a substantially correlated acceleration of head movement between the first speaker and the first participant during the first time period, the first participant as a second speaker of the conversation, the second speaker being a next speaker to the first speaker.

16. The non-transitory computer-readable recording medium of claim 15, the computer-executable program instructions when executed further causing the system to:

interactively provide an indication of the estimated second speaker at least to the first speaker for causing the first speaker to keep silence as the estimated second speaker starts a second utterance.

17. The non-transitory computer-readable recording medium of claim 15, the computer-executable program instructions when executed further causing the system to:

estimate a second time period, the second time period starting at the end of an utterance by the first speaker of the conversation, and the second time period ending at a beginning of a second utterance by the estimated second speaker; and automatically generate, by a third speaker, a third utterance prior to the estimated second time period elapses, the third speaker being distinct from the first speaker and the second speaker.

18. The non-transitory computer-readable recording medium of claim 15, wherein the head movement data comprises:

positions of heads of the plurality of participants of the conversation, rotation angles of heads of the plurality of participants of the conversation, and sound data of one or more of the plurality of participants of the conversation making one or more utterances.

19. The non-transitory computer-readable recording medium of claim 18, the computer-executable program instructions when executed further causing the system to:

estimating the first participant as the second speaker based on:

a degree of synchronized movement of heads of the first speaker and the first participant, the degree of synchronized movement of heads corresponding to a difference between acceleration of at least either linear or angular movement of the heads, and a predetermined threshold associated with the degree.

20. The non-transitory computer-readable recording medium of claim 18, the computer-executable program instructions when executed further causing the system to:

training an estimation model using learning data, wherein the learning data is based on past conversation data, and wherein the past conversation data include one or more speakers from one or more past conversations and head movement data of a plurality of participants of the one or more past conversations; and estimate, based on the trained estimation model and the synchronization data, the second speaker of the conversation.

* * * * *